(12) United States Patent
Ancell et al.

(10) Patent No.: US 12,182,887 B2
(45) Date of Patent: Dec. 31, 2024

(54) HOME UTILITY MANAGEMENT SYSTEM

(71) Applicant: Texas Tech University System, Lubbock, TX (US)

(72) Inventors: Brian Ancell, Lubbock, TX (US); Carol Lindquist, Lubbock, TX (US); Nadia Flores, Lubbock, TX (US); Beibei Ren, Lubbock, TX (US); Ken Rainwater, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 637 days.

(21) Appl. No.: 17/442,250

(22) PCT Filed: Mar. 25, 2020

(86) PCT No.: PCT/US2020/024784
§ 371 (c)(1),
(2) Date: Sep. 23, 2021

(87) PCT Pub. No.: WO2020/198399
PCT Pub. Date: Oct. 1, 2020

(65) Prior Publication Data
US 2022/0164903 A1   May 26, 2022

Related U.S. Application Data

(60) Provisional application No. 62/823,291, filed on Mar. 25, 2019.

(51) Int. Cl.
*G06Q 50/06*         (2024.01)
*G01W 1/10*          (2006.01)
(Continued)

(52) U.S. Cl.
CPC .............. *G06Q 50/06* (2013.01); *G01W 1/10* (2013.01); *G01W 1/14* (2013.01); *H02J 3/003* (2020.01);
(Continued)

(58) Field of Classification Search
CPC ...... G06Q 50/06; H02J 3/003; H02J 2300/28; H02J 2300/40; H02J 2300/24; G01W 1/10; G01W 1/14
(Continued)

(56) References Cited

U.S. PATENT DOCUMENTS 9,190,844 B2   11/2015   Tran
9,564,757 B2    2/2017   Wang et al.
(Continued)

FOREIGN PATENT DOCUMENTS

JP   2005086953   3/2005
KR   10-1448453   3/2014
(Continued)

OTHER PUBLICATIONS

"Method for calculating the optimal room temperature by using the measurement amount of each of a plurality of heating and cooling facilities" Korean patent Publication KR 101448453 B1 By Nara (Year: 2014).*
(Continued)

*Primary Examiner* — Zeina Elchanti
(74) *Attorney, Agent, or Firm* — Daniel J. Chalker; Edwin S. Flores; Chalker Flores, LLP

(57) ABSTRACT

A utility management system and method including a water collection apparatus; a water storage apparatus in fluid communication with the water collection apparatus; a water storage quantity sensor; one or more water usage sensors; an energy generation apparatus; an energy storage apparatus coupled to the energy generation apparatus; an energy
(Continued)

storage quantity sensor; one or more energy usage sensors; a processor with one or more channels to receive at least weather forecast data, water usage data, and energy usage data, and one or more channels to send at least a request for weather forecast data, wherein the processor is coupled to the one or more water usage sensors and energy usage sensors, and wherein the processor is programmed to use the received data to project water collection, water storage, energy generation, and energy storage and to formulate recommendations for water and energy usage; a control interface; and a data display.

46 Claims, 5 Drawing Sheets

(51) Int. Cl.
 *G01W 1/14* (2006.01)
 *H02J 3/00* (2006.01)
(52) U.S. Cl.
 CPC ....... *H02J 2300/24* (2020.01); *H02J 2300/28* (2020.01); *H02J 2300/40* (2020.01)
(58) Field of Classification Search
 USPC ........................................................ 705/412
 See application file for complete search history.

(56) References Cited

U.S. PATENT DOCUMENTS

| | | | |
|---|---|---|---|
| 2013/0073104 A1 | 3/2013 | Sciacchitano | |
| 2013/0162037 A1 | 6/2013 | Kim et al. | |
| 2014/0277814 A1 | 9/2014 | Hall et al. | |
| 2018/0138704 A1 | 5/2018 | Hall et al. | |

FOREIGN PATENT DOCUMENTS

| | | | | |
|---|---|---|---|---|
| WO | 2012058114 | | 5/2012 | |
| WO | WO-2017127373 A1 * | 7/2017 | ............. G05B 15/02 |
| WO | 2017127373 | | 8/2017 | |
| WO | 2018083202 | | 5/2018 | |
| WO | WO-2018083202 A1 * | 5/2018 | ............. C02F 1/008 |

OTHER PUBLICATIONS

"Utility Load Management Using Home Automation" Published by IEEE (Year: 1991).*
Arnell, N. "Climate change and global water resources." Global Environmental Change (1999), 9:S31-S49.
Hamlet, A. F. and D. P. Lettenmaier, "Effects of 20th century warmin and climate variability on flood risk in the western U.S." Water Resources Research (2007), 43:W06427.
International Search Report and Written Opinion for PCT/US2020/024784 dated Jul. 30, 2020.
Ren, Y., et al., "Nonlinear PI control for variable pitch wind turbine." Control Engineering Practice (2016), 50:84-94.
Skamarock, W. C., et al., A description of the advanced research WRF version 3. NCAR Technical Note NCAR/TN-475+STR (2008), doi:10.5065/D68S4MVH.
Vorosmarty, C. J., et al., "Global water resources: vulnerability from climate change and population growth" Science (2000), 289:284-288.
Wang, Y., et al., "Interactive Dispatch Modes and Bidding Strategy of Multiple Virtual Power Plants Based on Demand Response and Game Theory." IEEE Transactions on Smart Grid (2016), 7:510-519.
Wang, Y., et al., "Research on Resilience of Power Systems Under Natural Disasters—A Review." IEEE Transactions on Power Systems (2016), 31:1604-1613.
Wang, Z., et al., "Networked microgrids for self-healing power systems." IEEE Transactions on Smart Grid (2016) 7:310-319.
Ziervogel, G., et al., "Climate change adaptation in a developing country context: the case of urban water supply in Cape Town." Climate and Development (2010), 2:94-110.

* cited by examiner

HOME UTILITY MANAGEMENT SYSTEM

CROSS-REFERENCE TO RELATED APPLICATIONS

This application claims priority to and is the National Stage application of International Application No. PCT/US2020/0024784, filed Mar. 25, 2020, which claims priority to U.S. provisional patent application Ser. No. 62/823,291 filed on Mar. 25, 2019 and entitled "Home Utility Management System". The contents of both applications are incorporated by reference herein in their entirety.

STATEMENT OF FEDERALLY FUNDED RESEARCH

Not applicable.

TECHNICAL FIELD OF THE INVENTION

The present invention relates in general to the field of water and energy usage management in a home or other structure. In particular, the present invention relates to the use of computer-based algorithms to use water and energy usage, storage, and replenishment predictions to predict usage needs and to make usage recommendations for a home or other structure.

BACKGROUND OF THE INVENTION

PCT Application WO2012058114 (A2), to Petra Solar Inc., is said to disclose a method and a system for implementing a control strategy for Distributed Generation (DG) units, in which the control strategy is implemented in such a fashion so that a DG unit behaves similar to a synchronous generator. The method also describes grouping of multiple DG units to form a micro grid by using a supervisory control agent. The micro girds may further be arranged in a hierarchy.

U.S. Pub. Pat. App. No. 2014/0277814, by Hall, et al., is said to disclose a method, apparatus, system and computer program for controlling an electric power system, including implementation of voltage measurement using paired t statistical analysis applied to calculating a shift in average usage per customer from one time period to another time period for a given electrical use population where the pairing process is optimized using a novel technique to improve the accuracy of the statistical measurement.

U.S. Pat. No. 9,564,757, to Wang et al., is said to disclose an apparatus that optimizes a hybrid power system with respect to long-term characteristics of the hybrid power system. The apparatus includes a real-time controller of the hybrid power system and a processor. The processor cooperates with the real-time controller and is structured to input current measurements of information from the hybrid power system and hybrid dynamics information including continuous dynamics and discrete time dynamics that model the hybrid power system. The processor provides online optimization of the hybrid power system based upon the input, and outputs a power flow reference and a number of switch controls to the real-time controller based upon the online optimization. The processor is further structured to provide at least one of: real-time forecasts or real-time prediction of future information operatively associated with the hybrid power system as part of the input, and real-time processing of the online optimization.

U.S. Pub. Pat. App. No. 2013/0073104, by Sciacchitano, is said to disclose an intelligent energy management system containing one or more autonomous modules. Modules may be portable or stationary. Each consists of an intelligent controller, power converters, distribution bus, and energy storage unit, and can function independently. The intelligent controller uses artificial intelligent algorithms to learn from past performance and improves itself during operation. The system can interface with a variety of energy sources. When connected together the modules form a micro-grid which manages, stores, and distributes power. Each module in the intelligent micro-grid may be different. Each module may connect to different types of energy generation or contain different energy storage units. The system might consist of modules with energy storage units that may be removable from each module. In another embodiment, energy generation may also be integrated into each module. In another, each module may be used alone or with external energy sources, but without other modules.

U.S. Pat. No. 9,190,844, issued to Tran, is said to disclose a system for detecting individual appliance energy loads from a building composite load profile including an electric meter to capture building composite load profile; a detector coupled to the meter to detect transitions in the load profile to determine an appliance state machine for each appliance; a clusterizer to detect clusters of patterns in the load profile; and an analyzer coupled to the detector to receive the transitions and appliance state machines from the detector, the analyzer matching each transition to a predetermined appliance state machine to disaggregate the building composite load profile into individual appliance energy loads.

The consumption of water and energy resources provides the foundation on which stable and sustainable societies and economies are maintained. The utility infrastructure currently in place that supports much of the water and power usage in the U.S. and globally, however, presents several potentially serious issues. In arid regions or in times of drought, surface and groundwater supply can fall short of residential and commercial water demand, a problem projected to become worse with projected climate variability and future population growth (Arnell 1999, Vorosmarty et al. 2000, Hamlet and Lettenmaier 2007). Such issues have already plagued areas such as Cape Town, South Africa where some form of utility adaptation is already needed to mitigate severe water stress (Ziervogel et al. 2011). Emissions from fossil fuel-based power generation increase atmospheric greenhouse gas concentrations that play a role in Earth's climate, potentially leading to serious global consequences with regard to aspects well beyond the climate itself (e.g. agricultural food supply, or sea level). Even with the continued development of renewable energy systems that harvest wind and solar power, centralized utility systems leave large portions of society vulnerable to natural hazards and cyber terrorism. In turn, a critical need exists to create utility systems that can mitigate these potentially disastrous societal, economic, and environmental problems. This need is well represented among the national priorities to increase the use of renewable energy and enhance the security and resiliency of power and water systems.

While these energy and water issues are recognized, however, most attempts to mitigate them continue to stem from the supply side. In other words, water distribution and electrical grid systems are generally designed and improved with little input from a key system variable: the behavior of the end user. For example, efforts to create cleaner energy may involve replacing coal power plants with wind farms, but they likely do not consider how modified power consumption patterns could help reduce energy demand in the first place. Studies such as Parker et al. (2008) have demonstrated, however, a substantial gain in energy-use efficiency when there is feedback between residents and the utility system. Further, the perceived sense of ownership of water and power that are generated and stored onsite results in more conservative and sustainable use of resources. In turn, if the fundamental approach to improving the resiliency and sustainability of water and energy systems could shift to consider the behavioral-side aspects of utility end users, a potentially transformative and greatly enhanced utility infrastructure could emerge. Such a "ground-up" approach, if successful, would likely scale rapidly to broader societal and economic dimensions given the substantial influence of end users which ultimately drives water and power systems' supply and design.

A system and method for using renewable resources such as wind power, solar power, and collected water to supply a structure such as a home, while using weather forecasts and resource usage and storage data to predict future supplies and to make usage recommendations is desirable.

SUMMARY OF THE INVENTION

In some embodiments of the disclosure, a utility management system is disclosed as including a water subsystem including: a water collection apparatus; a water storage apparatus in fluid communication with the water collection apparatus; a water storage quantity sensor installed in the water storage apparatus; and one or more water usage sensors installed in the water storage apparatus, at a water fixture, or in a fluid connection between the water storage apparatus and the water fixture; an energy subsystem including: an energy generation apparatus; an energy storage apparatus coupled to the energy generation apparatus; an energy storage quantity sensor installed at the energy storage apparatus; and one or more energy usage sensors installed at the energy storage apparatus, in an energy-using device, or at an energy connection between the energy storage apparatus and the energy using device; a processor with one or more input channels to receive at least weather forecast data, water usage data from the one or more water usage sensors, and energy usage data from the energy usage sensors, and one or more output channels to send at least a request for weather forecast data, wherein the processor is coupled to the one or more water usage sensors and the one or more energy usage sensors, and wherein the processor is programmed to use at least the weather forecast data to project water collection, water storage, energy generation, and energy storage for a specified time period and to formulate recommendations for water usage and energy usage for the specified time period; a control interface coupled to the processor; and a data display coupled to the processor. In one aspect, the water collection apparatus includes at least a rainfall harvest apparatus. In another aspect, the water storage apparatus includes at least a water tank. In another aspect, the energy generation apparatus includes a wind turbine, a solar panel, or both. In another aspect, the energy storage apparatus includes a battery. In another aspect, the utility management system further includes an interface to an energy utility to provide energy from outside the utility management system. In another aspect, the one or more water usage sensors include a water usage sensor at an output of the water storage apparatus. In another aspect, the one or more water usage sensors include a water usage sensor at an input or an output of a water fixture. In another aspect, the one or more energy usage sensors include an energy usage sensor at an output of the energy storage apparatus. In another aspect, the one or more energy usage sensors include an energy usage sensor at an input of an energy-using device. In another aspect, the utility management system further includes an interface to a water utility to provide water from outside the utility management system; and the one or more water usage sensors include a water usage sensor at an output of the interface with the water utility. In another aspect, the utility management system further includes an interface to an energy utility to provide energy from outside the utility management system; and the one or more energy usage sensors include an energy usage sensor at an output of the interface with the energy utility. In another aspect, the processor uses least the weather forecast data to project at least rainfall and cloud cover for a specified time period. In another aspect, the processor uses at least a projected rainfall and a projected cloud cover for the specified time period to project water collection and energy storage for the specified time period. In another aspect, the processor uses at least the projected water collection and energy storage for the specified time period to formulate recommendations for water usage and energy usage for the projected time period. In another aspect, the processor uses at least a projected water usage a projected energy usage for the specified time period to formulate recommendations for water usage and energy usage for the projected time period.

In some embodiments of the disclosure, a method of managing utilities is disclosed as including receiving input including a collected water quantity and a stored energy quantity; receiving input including water usage and energy usage; receiving input including weather forecast data; calculating a projected water collection and storage quantities and projected energy generation and storage quantities for the specified time period from the projected rainfall and projected cloud cover for the specified period; and calculating one or more recommendations for water usage and energy usage for the specified period based on at least the projected storage quantities and projected energy storage quantities. In one aspect, the receiving input including water usage and energy usage includes receiving input from a water storage apparatus and an energy storage apparatus, respectively. In another aspect, the receiving input including water usage and energy usage includes receiving input from a water inlet or a water outlet of a water fixture and from an energy input of an energy-using device, respectively.

In some embodiments of the disclosure, a utility management system is disclosed as a water distribution system; one or more water storage devices connected to the water distribution system; one or more water-using devices connected to the water distribution system; an electrical distribution system; one or more energy storage devices coupled to the electrical distribution system; one or more energy-using devices coupled to the electrical distribution system; a plurality of sensors coupled to the one or more water storage devices, the one or more energy storage devices, the one or more water-using devices, and the one or more energy-using devices; a communications interface communicably coupled to the plurality of sensors; a data storage; and one or more processors communicably coupled to the communications interface and the data storage, wherein the one or more processors receive a water storage level for the one or more water storage devices and a power storage level for the one or more energy storage devices via the communications interface, store the water storage level and the power storage level in the data storage, receive a water usage for the one or more water-using devices and a power usage for the one or more energy-using devices via the communications interface, store the water usage and the power usage in the data storage, receive a weather forecast data via the communications interface, calculate a projected water collection and a projected energy generation for a specified time period based on the weather forecast data, calculate a projected water usage and a projected energy usage for the specified time period based a historical water usage data, a historical energy usage and the weather forecast data, calculate one or more recommendations based on the projected water usage and the projected energy usage for the specified time period, and automatically provide the one or more recommendations to a user device via the communications interface.

In one aspect, the one or more processors automatically control the one or more water-using devices and the one or more energy-using devices based on the one or more recommendations. In another aspect, the communications interface is communicably coupled to an external energy provider and an external water provider. In another aspect, the one or more processors control a flow of electricity from or to the external energy provider, and control a flow of water from the external water provider. In another aspect, the one or more processors receive a grey water flow data and a sewage flow data via the communications interface. In another aspect, the weather forecast data comprises a solar radiation forecast, a wind speed forecast, a precipitation forecast or a temperature forecast. In another aspect, the specified time period comprises a two-day time frame and a two-week time frame. In another aspect, the one or more recommendations comprise one or more warnings or alerts. In another aspect, the projected water collection is further based on one or more water collection devices; and the projected energy generation is further based on one or more energy generation devices comprising one or more solar panels or one or more wind power generators. In another aspect, the one or more processors receive a fossil fuel storage level for one or more fossil fuel storage devices via the communications interface, store the fossil fuel storage level in the data storage, receive a fossil fuel usage for one or more fossil fuel devices, store the fossil fuel usage in the data storage, calculate a projected fossil fuel usage for the specified time period based a historical fossil fuel usage and the weather forecast data; the one or more recommendations are further based on the projected fossil fuel usage for the specified time period; and the one or more fossil fuel devices comprise a generator, a water heater, a gas appliance, a furnace, or a gas outlet. In another aspect, the user device comprises a display, a television, a mobile communications device, a personal data assistant, a laptop computer, or an electronic tablet. In another aspect, the one or more water storage devices comprise a tank, a cistern, a well, or a reservoir; and the one or more energy storage devices comprise an electrochemical energy storage device, an electromagnetic energy storage device, a mechanical energy storage device, or a thermal energy storage device; and the one or more water-using devices comprise a washer, a dishwasher, a faucet, a shower, a toilet, or a sprinkler system. In another aspect, the electrochemical energy storage device comprises a battery or an electrochemical capacitor; the mechanical energy storage device comprises a compressed air energy storage system, or a flywheel energy storage system; and the thermal energy storage device comprises a hot water storage device, a latent heat thermal energy storage system, a sensible heat storage system, or a geothermal source.

In some embodiments of the disclosure, a method of managing utilities is implemented by one or more processors communicably coupled to a communications interface and a data storage. The method is disclosed as receiving a water storage level for one or more water storage devices and a power storage level for one or more energy storage devices via the communications interface, and storing the water storage level and the power storage level in the data storage using the one or more processors; receiving a water usage for one or more water-using devices and a power usage for one or more energy-using devices via the communications interface, and storing the water usage and the power usage in the data storage using the one or more processors; receiving a weather forecast data via the communications interface; calculating a projected water collection and a projected energy generation for a specified time period based on the weather forecast data using the one or more processors; calculating a projected water usage and a projected energy usage for the specified time period based a historical water usage data, a historical energy usage and the weather forecast data using the one or more processors; calculating one or more recommendations based on the projected water usage and the projected energy usage for the specified time period; and automatically providing the one or more recommendations to a user device via the communications interface.

In one aspect, the method further comprising automatically controlling the one or more water-using devices and the one or more energy-using devices based on the one or more recommendations using the one or more processors. In another aspect, the communications interface is communicably coupled to an external energy provider and an external water provider. In another aspect, the method further comprises: controlling a flow of electricity from or to the external energy provider; and controlling a flow of water from the external water provider. In another aspect, the method further comprises receiving a grey water flow data and a sewage flow data via the communications interface. In another aspect, the weather forecast data comprises a solar radiation forecast, a wind speed forecast, a precipitation forecast or a temperature forecast. In another aspect, the specified time period comprises a two-day time frame and a two-week time frame. In another aspect, the one or more recommendations comprise one or more warnings or alerts. In another aspect, the projected water collection is further based on one or more water collection devices; and the projected energy generation is further based on one or more energy generation devices comprising one or more solar panels or one or more wind power generators. In another aspect, the method further comprises: receiving a fossil fuel storage level for one or more fossil fuel storage devices via the communications interface, and storing the fossil fuel storage level in the data storage using the one or more processors; receiving a fossil fuel usage for one or more fossil fuel devices, and storing the fossil fuel usage in the data storage using the one or more processors; calculating a projected fossil fuel usage for the specified time period based a historical fossil fuel usage and the weather forecast data using the one or more processors; wherein the one or more recommendations are further based on the projected fossil fuel usage for the specified time period; and wherein the one or more fossil fuel devices comprise a generator, a water heater, a gas appliance, a furnace, or a gas outlet. In another aspect, the user device comprises a display, a television, a mobile communications device, a personal data assistant, a laptop computer, or an electronic tablet. In another aspect, the one or more water storage devices and the one or more water-using devices are connected to a water distribution system; the one or more energy storage devices and the one or more energy-using devices are coupled to an electrical distribution system; and the communications interface is communicably coupled to a plurality of sensors that are coupled to the one or more water storage devices, the one or more energy storage devices, the one or more water-using devices, and the one or more energy-using devices. In another aspect, the one or more water storage devices comprise a tank, a cistern, a well, or a reservoir; the one or more energy storage devices comprise an electrochemical energy storage device, an electromagnetic energy storage device, a mechanical energy storage device, or a thermal energy storage device; and the one or more water-using devices comprise a washer, a dishwasher, a faucet, a shower, a toilet, or a sprinkler system. In another aspect, the electrochemical energy storage device comprises a battery or an electrochemical capacitor; the mechanical energy storage device comprises a compressed air energy storage system, or a flywheel energy storage system; and the thermal energy storage device comprises a hot water storage device, a latent heat thermal energy storage system, a sensible heat storage system, or a geothermal source.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Figure 1:
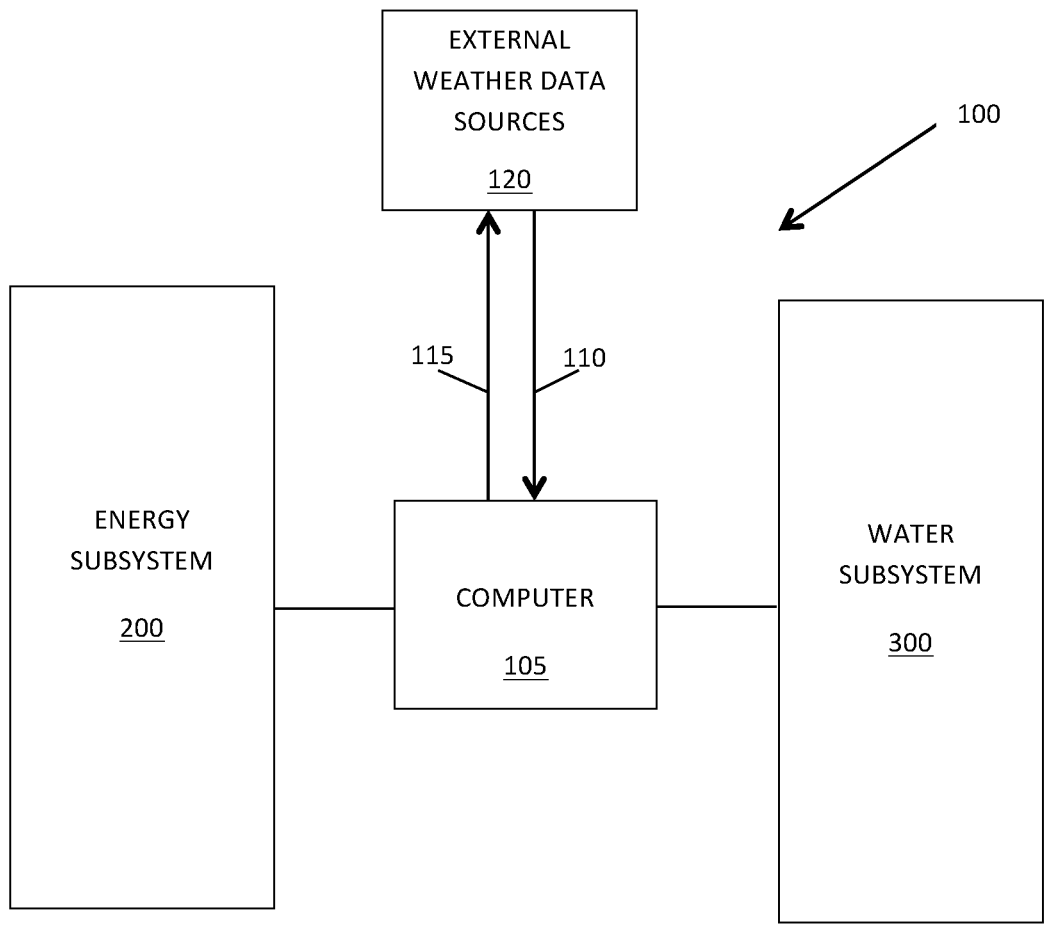
FIG. 1 shows an overview of the utility management system in accordance with one embodiment of the present invention.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention is a novel cyber-physical system that takes advantage of and is central to the importance of the human end user. While the present invention is described herein mainly in terms of use with a home, it may be used with a variety of structures and their occupants (e.g., office buildings, schools, industrial facilities, compounds, farms, ranches, estates, businesses, etc.). The present invention provides a decentralized utility model based on renewable resources that enables individual homes to produce a substantial portion of their own power (e.g., with solar panels, a wind turbine, and a battery) and water (e.g., through rain harvest and water storage). The entire utility system is integrated into a computer that displays both current power and water storage levels and the expected future availability of water and power resources, obtained through high quality probabilistic weather prediction data. The present invention is unique because the interactive utility management system will provide guidance to household residents on how both water and power usage can be balanced with expected future resource recharge, resulting in a two-way sociotechnical utility-complete model. The success of this new type of interactive utility framework, which relies on new ways that humans consume local resources, can potentially transform today's utility infrastructure to solve societal water and power sustainability, vulnerability, and environmental issues. This advance is because the resulting efficiency of the new utility model will lead to reduced power and water consumption, primarily from renewable resources, all within a residential, affordable framework that can scale rapidly to substantial numbers of users. The present invention makes possible the following advantages:

1) Water and energy consumption patterns of home residents and building occupants generally can become more conservative when interacting with a utility management system that guides sustainable use of resources generated and stored onsite.

2) The use of onsite water and power generation and storage equipment in the context of the utility management system home can substantially reduce power and water usage from the larger electrical grid and water distribution system.

3) The quality of life afforded by the utility management system and its associated onsite water and power generation and storage equipment is acceptable to residents or occupants.

4) The amount of onsite water and power generation and storage equipment within the utility management system home is acceptably affordable to target users.

With the successful testing of these hypotheses, we expect the groundwork for a transformational utility infrastructure will have been created. The final phase of this work will involve planning for the next steps of the translation to the mainstream marketplace, where the benefits of decentralized utility use and management can be rapidly multiplied.

The underlying cyber-physical system itself includes several sensors (e.g., water storage level, battery charge), water and power metering devices (e.g., flow measurement on faucets, power usage by appliances), the utility management system software and display and control systems that regulate onsite versus grid resource usage, real-time probabilistic weather prediction data, and the physical construction and integration of the home and the associated onsite power and water generation equipment.

The utility management system can be viewed as an integration of a physical layer, a communication layer, and a computation layer that forms a functional interactive system that sustainably manages a home's power and water resources (e.g., from onsite generation and storage, as well as from the electrical grid and water distribution system).

All equipment associated with the generation of power (e.g., residential wind turbine, solar panels) and water (e.g., rain collection), the storage of power (e.g., battery) and water (e.g., storage tanks), and all associated infrastructure (e.g., wiring, plumbing, greywater and sewer systems) are included in the physical layer of the system. The home itself, with all necessary appliances, furniture, utility management system central computer and display, and services (e.g., television, internet, and cellular phone service), is also included in the physical layer. Insulation, construction materials, orientation relative to the sun, appliances, lighting, and window configuration are examples of design criteria used for the home. All sensing equipment and metering for water and power usage, generation, and storage are part of the physical layer, including wireless capability for all applicable devices.

Several devices from the physical layer generate data vital to the utility management system that are used to suggest sustainable water and power usage scenarios in the upcoming hours and days to residents. These devices include water flow metering on faucets, water-using appliances or fixtures (e.g., the dishwasher, washing machine, showers, tubs, sinks, and toilets), and the greywater system. Metering of electricity through all power-utilizing aspects of the home and sensors on the water tanks, battery, and onsite generators (e.g., solar panels, wind turbine) will also produce usage data. All these devices are selected and configured to produce wireless, real-time information to the utility management system. Real-time probabilistic weather forecast information from outside sources must also be provided to the utility management system.

The present invention's algorithms use data from the communication layer describing residents' past utilization, current storage, and future expected generation of power and water from probabilistic weather forecasts. These algorithms perform three main tasks: 1) associate water and power usage with the specific home appliances and equipment that use these resources using actual usage data, 2) predict upcoming heating or air conditioning needs based on weather forecast data and past usage, and 3) produce usage guidance based on the level of stored water and power as well as expected resource recharge using weather prediction data. This usage guidance will simply involve comparisons, which are displayed to the user as described herein, of estimated typical water and power usage versus stored and predicted future resources. The guidance will also involve alert situations based on these comparisons to make it easier for the end users to respond accordingly. For example, in situations where power or water shortages are expected at certain time horizons, a message, e.g., a "red alert," is produced for display which indicates the residents must adjust their resource usage, aided by the usage data output by the algorithms. The algorithms adapt to both current conditions and the current weather forecast instantaneously and are operated in full real-time capacity. The algorithms' outputs do not force usage behaviors onto the residents, but allows them maximum flexibility to adjust in ways that are the most comfortable toward sustainability and resource conservation.

The display of the utility management algorithms, e.g., a monitor connected to the utility management system computer or available on the home's television screen, are the interface between the physical layer and the human users of the system. The display presents the output of the smart algorithms to the human residents in an easy-to-use manner.

A critical input to the smart algorithms that will determine their success in sustaining power and water resources is weather forecast information. These data are used to predict both resource demand and the degree of future resource generation and recharge of storage. Basic weather forecasts are freely available, but they do not appropriately characterize the prediction of important weather variables as needed by the smart algorithms to accurately estimate optimized future usage scenarios. For example, high-resolution (e.g., 4-km grid spacing or finer) is required to accurately represent precipitation forecasts and their uncertainty, particularly that associated with convection, which will contribute a substantial proportion of water usage. In turn, producing the most accurate forecasts, and their associated uncertainties, for wind, precipitation, and solar radiation with a fine-scale ensemble forecast system is important. One embodiment of the present invention uses a forecasting system that uses the Weather Research and Forecasting (WRF) numerical model (Skamarock et al. 2008) and integrates 52 forecasts twice daily out to a 48-hour forecast horizon to characterize the most likely forecast (the forecast mean) as well as its uncertainty (the forecast spread). The system of the present invention performs its own data assimilation of thousands of observations through an ensemble Kalman filter (EnKF) (Evensen 1994) approach. Forecasts of solar radiation, wind speed, and precipitation at the testbed home location are supplied from this ensemble system to the algorithms so that they may adjust to changes in anticipated power and water generation and storage recharge over the 48-hour forecast horizon. Beyond the two-day time frame, forecasts from, e.g., the U.S. Global Ensemble Forecast System (GEFS), are used at lower resolution to anticipate the future resource and its uncertainty out to roughly two weeks. The algorithms learn to optimize resource management in a way that accounts for forecast bias and typical errors that are associated with these forecast products, and to derive relationships between forecast spread and resource management decisions.

Predictable and safe control must be guaranteed by the underlying distributed local controller of the present invention, which is fundamental for smart resource management systems. Smart inverter technologies are used to integrate renewable sources (e.g., solar panels, wind turbines) along with energy storage devices e.g., (batteries) and local loads at the home to form a residential microgrid, which can be operated at both islanded (isolated from external sources of power and water) and grid-tied (tied to external sources of power and water) modes. Smart inverters are intelligent local control devices that can maximize the power output of renewable energies, interface the renewable energies with the micro-grid, and achieve the power balance between the generation and loads autonomously. The fast and accurate responses involved are needed for the power flow control of the smart inverters to meet the requirement of the high-level decision-making layers involved with the algorithms. Because of the fast-changing nature of solar or wind power due to the intermittency of weather conditions, the smart inverters have a fast response to these fast-changing dynamics of solar or wind generators to maintain stable voltage and frequency at both islanded and grid-tied modes with seamless model change. Moreover, the three-phase unbalanced loads will result in double-frequency ripples in frequency and amplitude of the output voltage of the converter, which is harmful to some components in the micro-grid (e.g. batteries). Fault ride-through capability is required to enhance the resilience of the home microgrid, for example, with AC grid fault, or AC current sensor errors, etc. To achieve accurate power flow control with a fast response for the smart inverters, robust control strategies are used for distributed generators, particularly the solar panels and wind turbines, in the presence of system disturbances (e.g. variations of micro-grid voltage, load change, parameter drifts, and three-phase load unbalances). Also, for the smart inverters, multiplexed control strategies are used for operation at different modes, such as at the maximum power point tracking mode, or the islanded operation mode.

With regard to wind-turbines specifically, a robust control strategy has been proposed for the control of a variable speed wind turbine system based on a permanent magnet synchronous generator (PMSG), with a back-to-back converter (Ren et al. 2016). Compared with conventional vector control, this robust method can achieve reliable current decoupling control with a fast response. Moreover, the DC-link voltage regulation can achieve stable DC-link voltage under model uncertainties and external disturbances. This robust control is able to generate 5% more energy for the wind profile tested.

FIGS. 1-5 illustrate block diagrams of embodiments or aspects of the present invention as described herein. Each figure includes aspects of one or more of the three layers of the present invention: the physical layer, the communication layer, or the computation layer.

FIG. 1 shows an overview of the utility management system 100 in accordance with one embodiment of the present invention. Human operators use the computer 105 to use and manage the system 100. The computer 105 is also connected to output channels 110 and input channels 115 used to request and receive weather forecast data from one or more external weather data sources 120 as shown in FIGS. 1 and 4. The computer 105 is connected to the energy subsystem 200, which includes energy sources, energy storage devices, an interface with an energy utility grid, energy-using devices, and energy storage and usage sensors, as detailed in FIG. 2. The computer 105 is also connected to the water subsystem 300, which includes water sources, water storage devices, an interface with a water utility system, water fixtures, and storage and usage sensors, as detailed in FIG. 3. The computer 100 is connected to the sensors of energy subsystem 200 and water subsystem 300 and receives data from those sensors, as detailed in FIG. 4.

Figure 2:
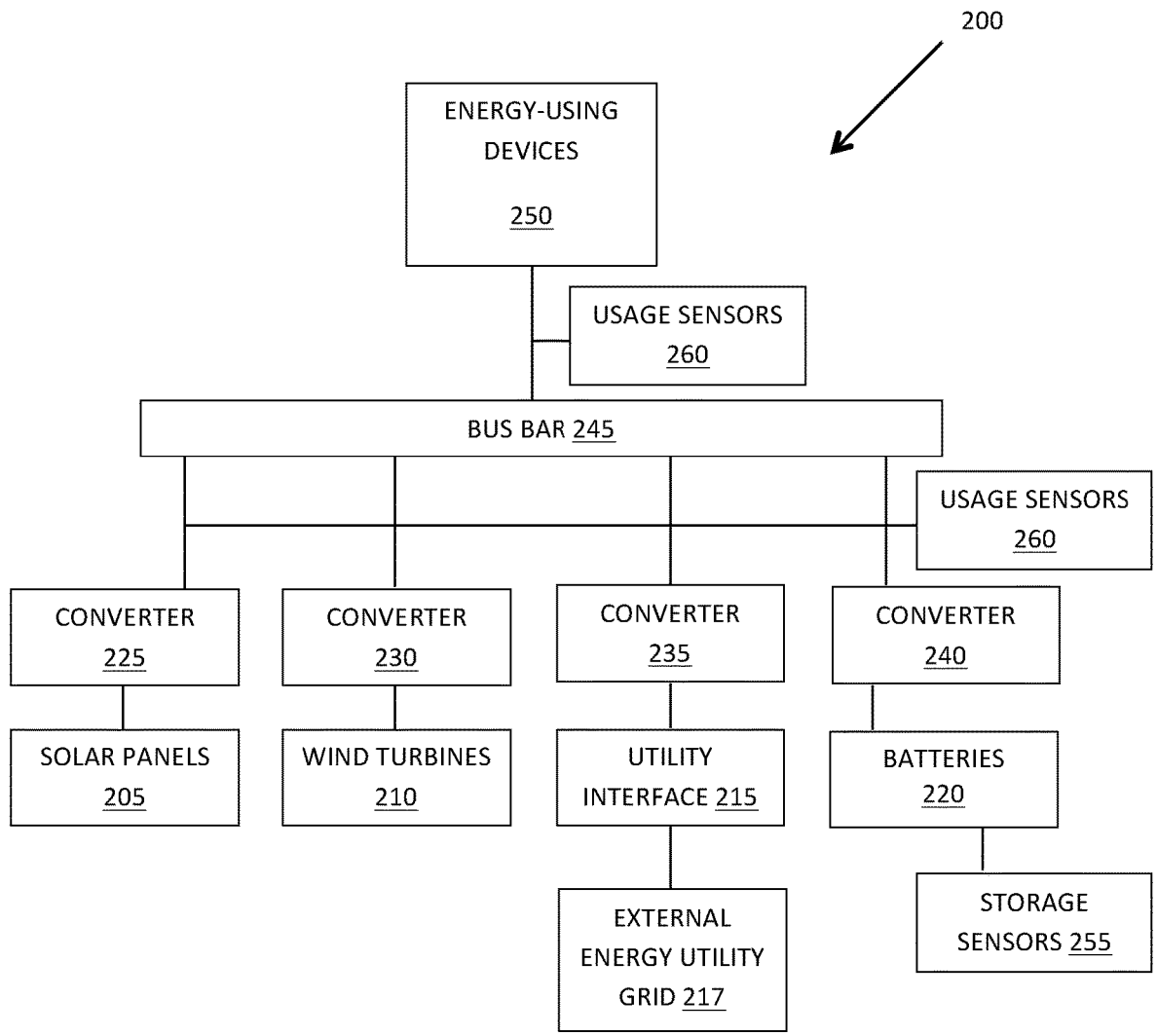
FIG. 2 depicts the energy subsystem of FIG. 1.

FIG. 2 depicts the energy subsystem 200. Among possible energy sources are those shown, one or more solar panels 205 and one or more wind turbines 210, both of which are dependent on weather phenomena, e.g., clear daytime skies for the solar panels 205 and winds for the wind turbines 210. The energy system 200 may also have an interface 215 with an external energy utility 217 grid through which to receive energy from outside the system 100. One or more energy storage apparatuses, here batteries 220, store energy from the energy sources or provide energy for the system 100. The solar panels 205, the wind turbines 210, the energy utility interface 215, the batteries 220, and any other energy sources are connected to converters, here shown as the converters 225, 230, 235, and 240. Each of these converters is connected to a power distribution node such as a bus bar or a breaker box, shown here as the bus bar 245. The energy-using devices 250 are also connected to the bus bar 245, and include, e.g., lights, heaters and air conditioners, kitchen appliances, office equipment, or computers such as the computer 105. One or more energy storage sensors 255 are placed at the batteries 220, and one or more energy usage sensors 260 are placed at the batteries 220, in the energy-using devices 250, or at an energy connection between the batteries 220 and the energy using devices 250.

Figure 3:
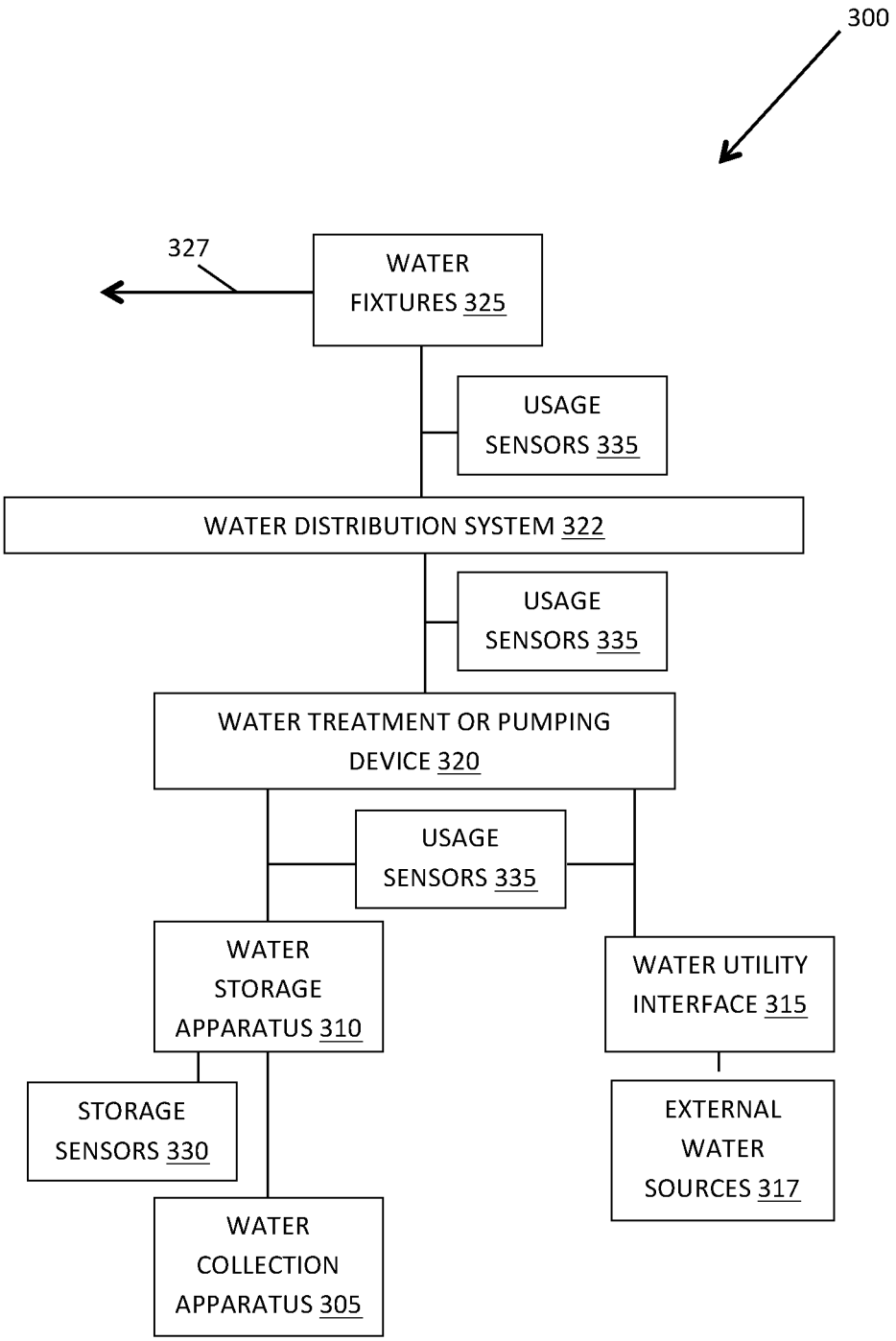
FIG. 3 illustrates the water subsystem of FIG. 1.
Figure 4:
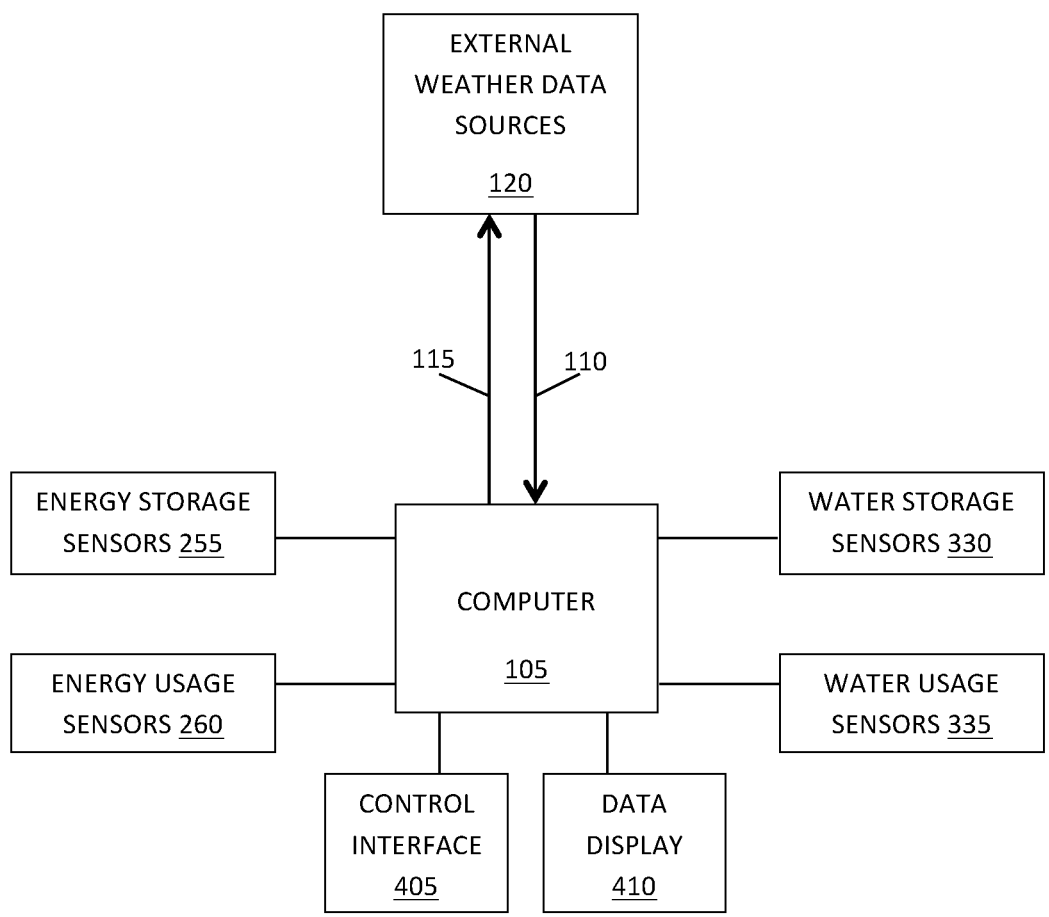
FIG. 4 shows the sensors and weather data sources to which the computer of FIG. 1 is connected.

FIG. 3 illustrates the water subsystem 300. Among possible water sources is that shown, a water collection apparatus 305 in fluid connection with a water storage apparatus, water tank 310, which is dependent on weather phenomena, e.g., rain or snow. The water system may also have interfaces 315 with external water sources 317 such as a water utility grid, one or more wells, bodies of water, or other water sources from which to receive water from outside the system 100. The water sources, water collection apparatus 305, the water tank 310, the interfaces 315, and any other water sources may be placed in fluid communication with a water treatment or pumping device 320 as desired. The water sources (or, if present, water treatment or pumping device 320) are placed in fluid connection via a water distribution system 322, e.g., pipes, to water fixtures 325 such as sinks, showers, washing machines, and water faucets. The water fixtures are placed in fluid connection with outlets 327 to remove used water from the system 100 or to carry it to purification or recirculation devices, which may serve as additional water sources. One or more water storage sensors 330 are placed at the water tank 310, and one or more water usage sensors 335 are placed at the water tank 310, at the water fixtures 325, at the interfaces 315, or at a water connection between the water tank 310 and the water fixtures 325 or the interfaces 315.

FIG. 4 shows the sensors and weather data sources to which the computer 105 is connected. The computer 105 is connected to sensors in energy subsystem 200 and in water subsystem 300. In energy subsystem 200, the computer 105 is connected to the energy storage sensors 255 and the energy usage sensors 260. In water subsystem 300, the computer 105 is connected to the water storage sensors 330 and the water usage sensors 335. Further, the computer 105 is connected to output channels 110 over which it may request weather forecast data from a variety of external weather data sources outside the system 100, including the U.S. National Weather Service and Texas Tech University, and it is connected to input channels 115 over which it can receive weather forecast data from those sources. The control interface 405 is coupled to the computer 105 for management of the system 100 by one or more operators, and the data display 410 is coupled to the computer 105 to display information about the system 100 or recommendations about energy and water usage, provided by software running on the computer 105.

Figure 5:
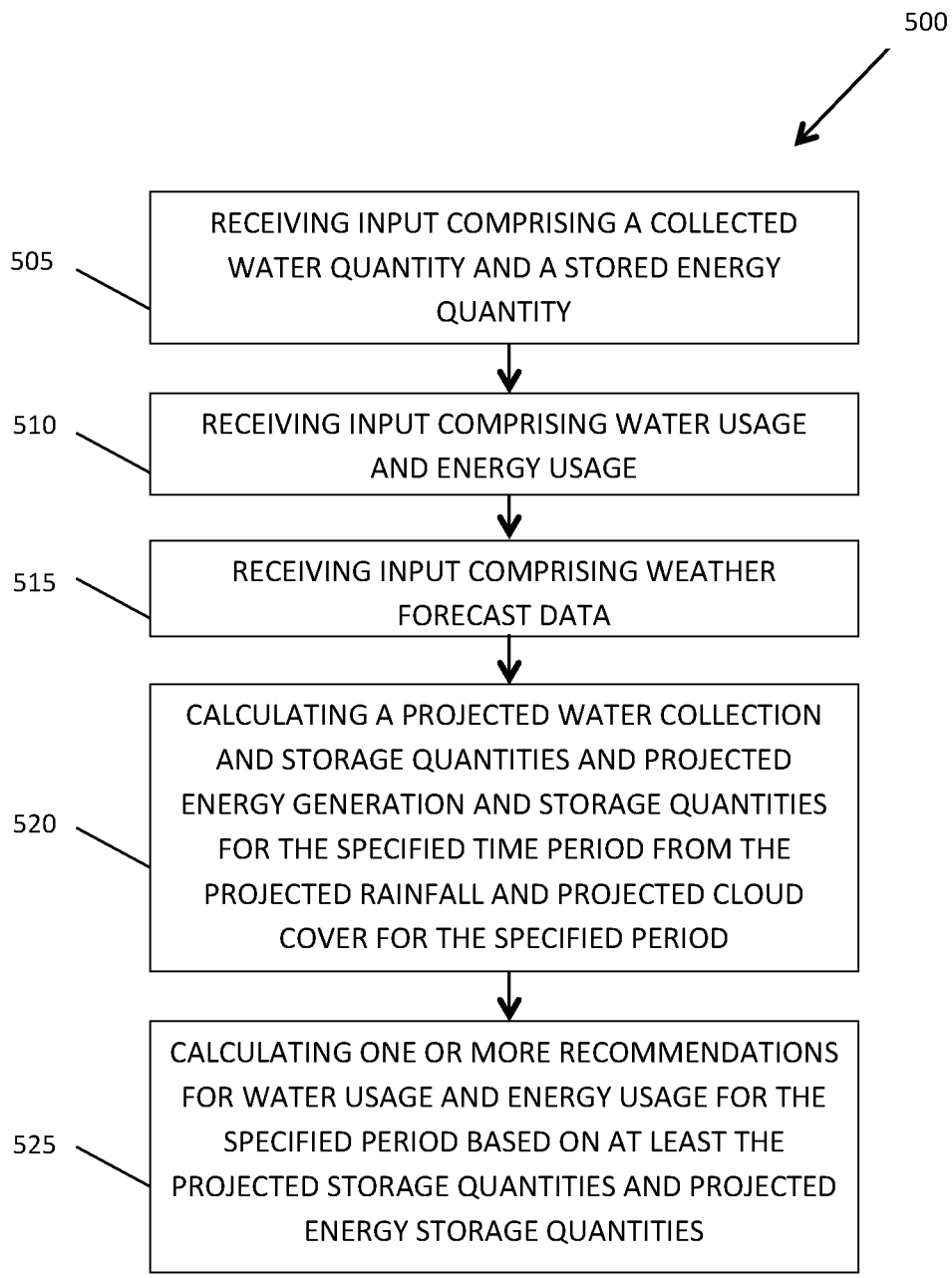
FIG. 5 shows a flowchart for a method for utility management in accordance with one embodiment of the present invention.

FIG. 5 shows a flowchart for a method 500 for utility management in accordance with one embodiment of the present invention. Block 505 includes receiving input including a collected water quantity and a stored energy quantity. Receiving input including water usage and energy usage is included in block 510, and block 515 includes receiving input including weather forecast data. Block 520 includes calculating a projected water collection and storage quantities and projected energy generation and storage quantities for the specified time period from the projected rainfall and projected cloud cover for the specified period. Block 525 includes calculating one or more recommendations for water usage and energy usage for the specified period based on at least the projected storage quantities and projected energy storage quantities.

In another embodiment of the present invention, the utility management system includes a water distribution system, one or more water storage devices connected to the water distribution system, one or more water-using devices connected to the water distribution system, an electrical distribution system, one or more energy storage devices coupled to the electrical distribution system, one or more energy-using devices coupled to the electrical distribution system, a plurality of sensors coupled to the one or more water storage devices, the one or more energy storage devices, the one or more water-using devices, and the one or more energy-using devices; a communications interface communicably coupled to the plurality of sensors; a data storage; and one or more processors communicably coupled to the communications interface and the data storage, wherein the one or more processors receive a water storage level for the one or more water storage devices and a power storage level for the one or more energy storage devices via the communications interface, store the water storage level and the power storage level in the data storage, receive a water usage for the one or more water-using devices and a power usage for the one or more energy-using devices via the communications interface, store the water usage and the power usage in the data storage, receive a weather forecast data via the communications interface, calculate a projected water collection and a projected energy generation for a specified time period based on the weather forecast data, calculate a projected water usage and a projected energy usage for the specified time period based a historical water usage data, a historical energy usage and the weather forecast data, calculate one or more recommendations based on the projected water usage and the projected energy usage for the specified time period, and automatically provide the one or more recommendations to a user device via the communications interface.

In one aspect, the one or more processors automatically control the one or more water-using devices and the one or more energy-using devices based on the one or more recommendations. In another aspect, the communications interface is communicably coupled to an external energy provider and an external water provider. In another aspect, the one or more processors control a flow of electricity from or to the external energy provider, and control a flow of water from the external water provider. In another aspect, the one or more processors receive a grey water flow data and a sewage flow data via the communications interface. In another aspect, the weather forecast data comprises a solar radiation forecast, a wind speed forecast, a precipitation forecast or a temperature forecast. In another aspect, the specified time period comprises a two-day time frame and a two-week time frame. In another aspect, the one or more recommendations comprise one or more warnings or alerts. In another aspect, the projected water collection is further based on one or more water collection devices; and the projected energy generation is further based on one or more energy generation devices comprising one or more solar panels or one or more wind power generators. In another aspect, the one or more processors receive a fossil fuel storage level for one or more fossil fuel storage devices via the communications interface, store the fossil fuel storage level in the data storage, receive a fossil fuel usage for one or more fossil fuel devices, store the fossil fuel usage in the data storage, calculate a projected fossil fuel usage for the specified time period based a historical fossil fuel usage and the weather forecast data; the one or more recommendations are further based on the projected fossil fuel usage for the specified time period; and the one or more fossil fuel devices comprise a generator, a water heater, a gas appliance, a furnace, or a gas outlet. In another aspect, the user device comprises a display, a television, a mobile communications device, a personal data assistant, a laptop computer, or an electronic tablet. In another aspect, the one or more water storage devices comprise a tank, a cistern, a well, or a reservoir; and the one or more energy storage devices comprise an electrochemical energy storage device, an electromagnetic energy storage device, a mechanical energy storage device, or a thermal energy storage device; and the one or more water-using devices comprise a washer, a dishwasher, a faucet, a shower, a toilet, or a sprinkler system. In another aspect, the electrochemical energy storage device comprises a battery or an electrochemical capacitor; the mechanical energy storage device comprises a compressed air energy storage system, or a flywheel energy storage system; and the thermal energy storage device comprises a hot water storage device, a latent heat thermal energy storage system, a sensible heat storage system, or a geothermal source.

In some embodiments of the disclosure, a method of managing utilities is implemented by one or more processors communicably coupled to a communications interface and a data storage. The method is disclosed as receiving a water storage level for one or more water storage devices and a power storage level for one or more energy storage devices via the communications interface, and storing the water storage level and the power storage level in the data storage using the one or more processors; receiving a water usage for one or more water-using devices and a power usage for one or more energy-using devices via the communications interface, and storing the water usage and the power usage in the data storage using the one or more processors; receiving a weather forecast data via the communications interface; calculating a projected water collection and a projected energy generation for a specified time period based on the weather forecast data using the one or more processors; calculating a projected water usage and a projected energy usage for the specified time period based a historical water usage data, a historical energy usage and the weather forecast data using the one or more processors; calculating one or more recommendations based on the projected water usage and the projected energy usage for the specified time period; and automatically providing the one or more recommendations to a user device via the communications interface.

In one aspect, the method further comprising automatically controlling the one or more water-using devices and the one or more energy-using devices based on the one or more recommendations using the one or more processors. In another aspect, the communications interface is communicably coupled to an external energy provider and an external water provider. In another aspect, the method further comprises: controlling a flow of electricity from or to the external energy provider; and controlling a flow of water from the external water provider. In another aspect, the method further comprises receiving a grey water flow data and a sewage flow data via the communications interface. In another aspect, the weather forecast data comprises a solar radiation forecast, a wind speed forecast, a precipitation forecast or a temperature forecast. In another aspect, the specified time period comprises a two-day time frame and a two-week time frame. In another aspect, the one or more recommendations comprise one or more warnings or alerts. In another aspect, the projected water collection is further based on one or more water collection devices; and the projected energy generation is further based on one or more energy generation devices comprising one or more solar panels or one or more wind power generators. In another aspect, the method further comprises: receiving a fossil fuel storage level for one or more fossil fuel storage devices via the communications interface, and storing the fossil fuel storage level in the data storage using the one or more processors; receiving a fossil fuel usage for one or more fossil fuel devices, and storing the fossil fuel usage in the data storage using the one or more processors; calculating a projected fossil fuel usage for the specified time period based a historical fossil fuel usage and the weather forecast data using the one or more processors; wherein the one or more recommendations are further based on the projected fossil fuel usage for the specified time period; and wherein the one or more fossil fuel devices comprise a generator, a water heater, a gas appliance, a furnace, or a gas outlet. In another aspect, the user device comprises a display, a television, a mobile communications device, a personal data assistant, a laptop computer, or an electronic tablet. In another aspect, the one or more water storage devices and the one or more water-using devices are connected to a water distribution system; the one or more energy storage devices and the one or more energy-using devices are coupled to an electrical distribution system; and the communications interface is communicably coupled to a plurality of sensors that are coupled to the one or more water storage devices, the one or more energy storage devices, the one or more water-using devices, and the one or more energy-using devices. In another aspect, the one or more water storage devices comprise a tank, a cistern, a well, or a reservoir; the one or more energy storage devices comprise an electrochemical energy storage device, an electromagnetic energy storage device, a mechanical energy storage device, or a thermal energy storage device; and the one or more water-using devices comprise a washer, a dishwasher, a faucet, a shower, a toilet, or a sprinkler system. In another aspect, the electrochemical energy storage device comprises a battery or an electrochemical capacitor; the mechanical energy storage device comprises a compressed air energy storage system, or a flywheel energy storage system; and the thermal energy storage device comprises a hot water storage device, a latent heat thermal energy storage system, a sensible heat storage system, or a geothermal source.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

REFERENCES

Nigel W Arnell. Climate change and global water resources. Global Environmental Change 9 (1999) S31-S49.

Alan F. Hamlet; Lettenmaier, Dennis P.; Effects of $20^{th}$ century warmin and climate variability on flood risk in the western U.S. Water Resources Research, Vol. 43, W06427, doi:10.1029/2006WR005099, 2007.

Yaxing Ren; Liuying Li; Joseph Brindley, Lin Jiang; Non-linear PI control for variable pitch wind turbine. Control Engineering Practice, vol. 50, May 2016, 84-94.

William C. Skamarock; Joseph B. Klemp; Jimy Dudhia; David O. Gill; Dale M. Barker; Michael G. Duda; Xiang-Yu Huang; Wei Wang; Jordan G. Powers. A description of the advanced research WRF version 3. NCAR Technical Note NCAR/TN-475+STR (2008), doi:10.5065/D68S4MVH.

Charles J. Vorosmarty; Pamela Green; Joseph Salisbury; Richard B. Lammers; Global water resources: vulnerability from climate change and population growth. Science, 289, 284 (2000); DOI: 10.1126/science.289.5477.284.

Yao Wang; Xin Ai; Zhongfu Tan; Lei Yan; Shuting Liu. Interactive Dispatch Modes and Bidding Strategy of Multiple Virtual Power Plants Based on Demand Response and Game Theory. IEEE Transactions on Smart Grid (Volume: 7, Issue: 1, January 2016).

Yezhou Wang; Chen Chen; Jianhui Wang; Ross Baldick. Research on Resilience of Power Systems Under Natural Disasters-A Review. IEEE Transactions on Power Systems (Volume: 31, Issue: 2, March 2016).

Zhaoyu Wang; Bokan Chen; Jianhui Wang; Chen Chen. Networked microgrids for self-healing power systems. IEEE Transactions on Smart Grid (Vol. 7, Issue 1, January 2016).

Gina Ziervogel, Moliehi Shale, Minlei Du; Climate change adaptation in a developing country context: the case of urban water supply in Cape Town. Climate and Development, 2:2 91-110 (2010), DOI: 10.3763/cdev.2010.0036.

What is claimed is:

1. A utility management system comprising:
   a water subsystem comprising:
      a water collection apparatus;
      a water storage apparatus in fluid communication with the water collection apparatus;
      a water storage quantity sensor installed in the water storage apparatus; and
      one or more water usage sensors installed in the water storage apparatus, at a water fixture, or in a fluid connection between the water storage apparatus and the water fixture;
   an energy subsystem comprising:
      an energy generation apparatus;
      an energy storage apparatus coupled to the energy generation apparatus;
      an energy storage quantity sensor installed at the energy storage apparatus; and
      one or more energy usage sensors installed at the energy storage apparatus, in an energy-using device, or at an energy connection between the energy storage apparatus and the energy using device;
   a processor with one or more input channels to receive at least weather forecast data, water usage data from the one or more water usage sensors, and energy usage data from the energy usage sensors, and one or more output channels to send at least a request for the weather forecast data, wherein the processor is coupled to the one or more water usage sensors and the one or more energy usage sensors, and wherein the processor is programmed to use at least the weather forecast data to project rainfall and cloud cover, project water collection based on the projected rainfall, water storage, energy generation, and energy storage based on the projected cloud cover for a specified time period and to formulate recommendations for water usage and energy usage for the specified time period;
   a control interface coupled to the processor; and
   a data display coupled to the processor.

2. The system of claim 1, wherein the water collection apparatus comprises at least a rainfall harvest apparatus.

3. The system of claim 1, wherein the water storage apparatus comprises at least a water tank.

4. The system of claim 1, wherein the energy generation apparatus comprises a wind turbine, a solar panel, or both.

5. The system of claim 1, wherein the energy storage apparatus comprises a battery.

6. The system of claim 1, further comprising an interface to an energy utility to provide energy from outside the utility management system.

7. The system of claim 1, wherein the one or more water usage sensors comprise a water usage sensor at an output of the water storage apparatus.

8. The system of claim 1, wherein the one or more water usage sensors comprise a water usage sensor at an input or an output of a water fixture.

9. The system of claim 1, wherein the one or more energy usage sensors comprise an energy usage sensor at an output of the energy storage apparatus.

10. The system of claim 1, wherein the one or more energy usage sensors comprise an energy usage sensor at an input of an energy-using device.

11. The system of claim 1, further comprising an interface to a water utility to provide water from outside the utility management system; and
    wherein the one or more water usage sensors comprise a water usage sensor at an output of the interface with the water utility.

12. The system of claim 1, further comprising an interface to an energy utility to provide energy from outside the utility management system; and
    wherein the one or more energy usage sensors comprise an energy usage sensor at an output of the interface with the energy utility.

13. The system of claim 1, wherein the processor uses at least the projected water collection and energy storage for the specified time period to formulate recommendations for water usage and energy usage for the projected time period.

14. The system of claim 1, wherein the processor uses at least a projected water usage and a projected energy usage for the specified time period to formulate recommendations for water usage and energy usage for the projected time period.

15. A method of managing utilities comprising:
providing a utility management system comprising:
a water subsystem comprising a water collection apparatus, a water storage apparatus in fluid communication with the water collection apparatus, a water storage quantity sensor installed in the water storage apparatus, and one or more water usage sensors installed at the water storage apparatus, in one or more water-using devices, or in a fluid connection between the water storage apparatus and the one or more water-using devices,
an energy subsystem comprising an energy generation apparatus, an energy storage apparatus coupled to the energy generation apparatus, an energy storage quantity sensor installed at the energy storage apparatus, and one or more energy usage sensors installed at the energy storage apparatus, in one or more energy-using devices, or at an energy connection between the energy storage apparatus and the one or more energy using devices, and
a processor and a communications interface communicably coupled to the processor and the water storage quantity sensor, one or more water usage sensors, the energy storage quantity sensor and the one or more energy usage sensors;
receiving a collected water quantity from the water storage quantity sensor and a stored energy quantity from the energy storage quantity sensor via the communications interface;
receiving a water usage from the one or more water usage sensors and an energy usage from the one or more energy usage sensors via the communications interface;
receiving a weather forecast data via the communications interface;
calculating a projected rainfall and a projected cloud cover using the weather forecast data and the processor;
calculating a projected water collection and storage quantities using the projected rainfall and the collected water quantity and a projected energy generation and storage quantities using the projected cloud cover and the stored energy quantity for the specified time period using the processor;
calculating one or more recommendations for water usage and energy usage for the specified period based on at least the projected storage quantities, a historical water usage, projected energy storage quantities and a historical energy usage using the processor; and
providing the one or more recommendations to a user device via the communications interface.

16. The method of claim 15, further comprising automatically controlling the one or more water-using devices and the one or more energy-using devices based on the one or more recommendations using the processor.

17. The method of claim 15, wherein the communications interface is communicably coupled to an external energy provider and an external water provider.

18. The method of claim 17, further comprising:
controlling a flow of electricity from or to the external energy provider; and
controlling a flow of water from the external water provider.

19. The method of claim 15, further comprising:
receiving a fossil fuel storage level for one or more fossil fuel storage devices via the communications interface, and storing the fossil fuel storage level in the data storage using the processor;
receiving a fossil fuel usage for one or more fossil fuel devices, and storing the fossil fuel usage in the data storage using the processor;
calculating a projected fossil fuel usage for the specified time period based a historical fossil fuel usage and the weather forecast data using the processor;
wherein the one or more recommendations are further based on the projected fossil fuel usage for the specified time period; and
wherein the one or more fossil fuel devices comprise a generator, a water heater, a gas appliance, a furnace, or a gas outlet.

20. A utility management system comprising:
a water distribution system;
one or more water storage devices connected to the water distribution system;
one or more water-using devices connected to the water distribution system;
an electrical distribution system;
one or more energy storage devices coupled to the electrical distribution system;
one or more energy-using devices coupled to the electrical distribution system;
a plurality of sensors coupled to the one or more water storage devices, the one or more energy storage devices, the one or more water-using devices, and the one or more energy-using devices;
a communications interface communicably coupled to the plurality of sensors;
a data storage; and
one or more processors communicably coupled to the communications interface and the data storage, wherein the one or more processors receive a water storage level for the one or more water storage devices and a power storage level for the one or more energy storage devices via the communications interface, store the water storage level and the power storage level in the data storage, receive a water usage for the one or more water-using devices and a power usage for the one or more energy-using devices via the communications interface, store the water usage and the power usage in the data storage, receive a weather forecast data via the communications interface, calculate a projected rainfall and a projected cloud cover using the weather forecast data, calculate a projected water collection using the projected rainfall and a projected energy generation using the projected cloud cover for a specified time period, calculate a projected water usage and a projected energy usage for the specified time period based a historical water usage data, a historical energy usage and the weather forecast data, calculate one or more recommendations based on the projected water usage and the projected energy usage for the specified time period, and automatically provide the one or more recommendations to a user device via the communications interface.

21. The system of claim 20, wherein the one or more processors automatically control the one or more water-using devices and the one or more energy-using devices based on the one or more recommendations.

22. The system of claim 20, wherein the communications interface is communicably coupled to an external energy provider and an external water provider.

23. The system of claim 22, wherein the one or more processors control a flow of electricity from or to the external energy provider, and control a flow of water from the external water provider.

24. The system of claim 20, wherein the one or more processors receive a grey water flow data and a sewage flow data via the communications interface.

25. The system of claim 20, wherein the weather forecast data comprises a solar radiation forecast, a wind speed forecast, a precipitation forecast or a temperature forecast.

26. The system of claim 20, wherein the specified time period comprises a two-day time frame and a two-week time frame.

27. The system of claim 20, wherein the one or more recommendations comprise one or more warnings or alerts.

28. The system of claim 20, wherein:
the projected water collection is further based on one or more water collection devices; and
the projected energy generation is further based on one or more energy generation devices comprising one or more solar panels or one or more wind power generators.

29. The system of claim 20, wherein:
the one or more processors receive a fossil fuel storage level for one or more fossil fuel storage devices via the communications interface, store the fossil fuel storage level in the data storage, receive a fossil fuel usage for one or more fossil fuel devices, store the fossil fuel usage in the data storage, calculate a projected fossil fuel usage for the specified time period based a historical fossil fuel usage and the weather forecast data;
the one or more recommendations are further based on the projected fossil fuel usage for the specified time period; and
the one or more fossil fuel devices comprise a generator, a water heater, a gas appliance, a furnace, or a gas outlet.

30. The system of claim 20, wherein the user device comprises a display, a television, a mobile communications device, a personal data assistant, a laptop computer, or an electronic tablet.

31. The system of claim 20, wherein:
the one or more water storage devices comprise a tank, a cistern, a well, or a reservoir; and
the one or more energy storage devices comprise an electrochemical energy storage device, an electromagnetic energy storage device, a mechanical energy storage device, or a thermal energy storage device; and
the one or more water-using devices comprise a washer, a dishwasher, a faucet, a shower, a toilet, or a sprinkler system.

32. The system of claim 31, wherein:
the electrochemical energy storage device comprises a battery or an electrochemical capacitor;
the mechanical energy storage device comprises a compressed air energy storage system, or a flywheel energy storage system; and
the thermal energy storage device comprises a hot water storage device, a latent heat thermal energy storage system, a sensible heat storage system, or a geothermal source.

33. A method of managing utilities implemented by one or more processors communicably coupled to a communications interface and a data storage, the method comprising:
providing a utility management system comprising:
a water subsystem comprising one or more water collection devices, one or more water storage devices in fluid communication with the one or more water collection devices, a water storage quantity sensor installed in the one or more water storage devices, and one or more water usage sensors installed at one or more water-using devices, or in a fluid connection between the one or more water storage devices and the one or more water-using devices,
an energy subsystem comprising one or more energy generation devices, one or more energy storage devices coupled to the one or more energy generation devices, an energy storage quantity sensor installed at the one or more energy storage devices, and one or more energy usage sensors installed at one or more energy-using devices, or at an energy connection between the one or more energy storage devices and the one or more energy-using devices, and
the one or more processors communicably coupled to the communications interface and the data storage;
receiving a water storage level for the one or more water storage devices and a power storage level for the one or more energy storage devices via the communications interface, and storing the water storage level and the power storage level in the data storage using the one or more processors;
receiving a water usage for one or more water-using devices and a power usage for one or more energy-using devices via the communications interface, and storing the water usage and the power usage in the data storage using the one or more processors;
receiving a weather forecast data via the communications interface;
calculating a projected rainfall and a projected cloud cover using the weather forecast data and the one or more processors;
calculating a projected water collection using the projected rainfall and a projected energy generation using the projected cloud cover for a specified time period using the one or more processors;
calculating a projected water usage and a projected energy usage for the specified time period based a historical water usage data, a historical energy usage, the projected rainfall and the projected cloud cover using the one or more processors;
calculating one or more recommendations based on the projected water usage and the projected energy usage for the specified time period; and
automatically providing the one or more recommendations to a user device via the communications interface.

34. The method of claim 33, further comprising automatically controlling the one or more water-using devices and the one or more energy-using devices based on the one or more recommendations using the one or more processors.

35. The method of claim 33, wherein the communications interface is communicably coupled to an external energy provider and an external water provider.

36. The method of claim 35, further comprising:
controlling a flow of electricity from or to the external energy provider; and
controlling a flow of water from the external water provider.

37. The method of claim 33, further comprising receiving a grey water flow data and a sewage flow data via the communications interface.

38. The method of claim 33, wherein the weather forecast data comprises a solar radiation forecast, a wind speed forecast, a precipitation forecast or a temperature forecast.

39. The method of claim 33, wherein the specified time period comprises a two- day time frame and a two-week time frame.

40. The method of claim 33, wherein the one or more recommendations comprise one or more warnings or alerts.

41. The method of claim 33, wherein:
the projected water collection is further based on the one or more water collection devices; and
the projected energy generation is further based on the one or more energy generation devices comprising one or more solar panels or one or more wind power generators.

42. The method of claim 33, further comprising:
receiving a fossil fuel storage level for one or more fossil fuel storage devices via the communications interface, and storing the fossil fuel storage level in the data storage using the one or more processors;
receiving a fossil fuel usage for one or more fossil fuel devices, and storing the fossil fuel usage in the data storage using the one or more processors;
calculating a projected fossil fuel usage for the specified time period based a historical fossil fuel usage and the weather forecast data using the one or more processors;
wherein the one or more recommendations are further based on the projected fossil fuel usage for the specified time period; and
wherein the one or more fossil fuel devices comprise a generator, a water heater, a gas appliance, a furnace, or a gas outlet.

43. The method of claim 33, wherein the user device comprises a display, a television, a mobile communications device, a personal data assistant, a laptop computer, or an electronic tablet.

44. The method of claim 33, wherein:
the one or more water storage devices and the one or more water-using devices are connected to a water distribution system; and
the one or more energy storage devices and the one or more energy-using devices are coupled to an electrical distribution system.

45. The method of claim 33, wherein:
the one or more water storage devices comprise a tank, a cistern, a well, or a reservoir;
the one or more energy storage devices comprise an electrochemical energy storage device, an electromagnetic energy storage device, a mechanical energy storage device, or a thermal energy storage device; and
the one or more water-using devices comprise a washer, a dishwasher, a faucet, a shower, a toilet, or a sprinkler system.

46. The method of claim 45, wherein:
the electrochemical energy storage device comprises a battery or an electrochemical capacitor;
the mechanical energy storage device comprises a compressed air energy storage system, or a flywheel energy storage system; and
the thermal energy storage device comprises a hot water storage device, a latent heat thermal energy storage system, a sensible heat storage system, or a geothermal source.

* * * * *